UNITED STATES PATENT OFFICE.

EILEV HANSEN, OF COPENHAGEN, DENMARK.

IMPROVEMENT IN ELECTROPLATING GLASS, CHINA, &c.

Specification forming part of Letters Patent No. 166,606, dated August 10, 1875; application filed January 9, 1875.

*To all whom it may concern:*

Be it known that I, EILEV HANSEN, of Copenhagen, in the Kingdom of Denmark, have invented a certain Improvement in the art of Electroplating Glass, China, and other like substances, of which the following is a specification:

The first step of my invention for electroplating glass, china, and similar vitreous or earthen substances consists in coating the entire surface to be plated with a compound prepared of sulphur dissolved in oil of spike (*Lavendula spica*) and chloride of gold or platinum, dissolved in sulphuric ether, and then subjecting the object thus prepared to baking or burning in a furnace, for the twofold purpose of driving off the sulphur, &c., and causing the gold or platinum to unite with the glass, forming a thin metallic film firmly adhering thereto. The second step in the process consists in plating surfaces thus metallized with metallic deposits, by electro-chemical action, in the ordinary manner.

To practice my invention, take a quantity of sulphur and dissolve it in oil of spike until the mixture attains a semi-fluid or treacle-like consistence. In the same way chloride of gold or platinum is dissolved in sulphuric ether. The solutions having been mixed together under a gentle heat, are evaporated to the consistence of paint. A thin coating of this compound is then painted upon the surface to be metallized, and the object thus coated is introduced into a furnace to be burned, in the usual manner. The heat will drive off the sulphur and other volatile ingredients of the coating compound, and brand the gold or platinum in a thin film into the glass.

Thus a permanent metallic base is formed upon the surface of the vitreous or earthen object that can then be properly electroplated, and will firmly retain the metallic deposit.

Although I have mentioned only the chlorides of gold and platinum as most suitable, such other solutions of gold or platinum may be used as may by chemical means be precipitated in the metallic form on such substance as stated, and will endure the firing or burning without losing the property of conducting electricity.

I do not claim, broadly, making a metallic deposit by electro-chemical action upon glass previously coated with a metallic base; nor do I claim, broadly, metallizing the surface of glass or like substances by burning a metallic coating upon it.

My invention is distinguishable from the old method of electroplating glass by providing the latter with a metallic base burned upon it, so that it will permanently adhere thereto with great tenacity, and the step in my process of thus providing the glass with a metallic base is distinguishable from the mode formerly practised for metallizing glass to make mirrors by employing a mineral in the solution, used for metallizing, which will not only readily vaporize at a moderate heat, but will also leave no ash whatever, so that the glass is ready to be electroplated after a single coat of the metallizing compound has been applied.

What I claim as my invention, and desire to secure by Letters Patent, is—

The herein-described process of forming a metallic covering on glass and like substances, consisting in first painting the surface with a solution containing sulphur, then baking or burning the article to drive off the sulphur and other volatiles, and to fix the metallic base thereon, and finally making a deposit by the electro-chemical process, all substantially as specified.

In testimony whereof I have signed my name to the foregoing specification in the presence of two subscribing witnesses.

EILEV HANSEN.

Witnesses:
VIGGO SCHMID,
FR. WOLFF.